US010135789B2

(12) United States Patent
Mayya et al.

(10) Patent No.: US 10,135,789 B2
(45) Date of Patent: Nov. 20, 2018

(54) METHOD AND SYSTEM OF ESTABLISHING A VIRTUAL PRIVATE NETWORK IN A CLOUD SERVICE FOR BRANCH NETWORKING

(71) Applicant: Nicira, Inc., Palo Alto, CA (US)

(72) Inventors: Ajit Ramachandra Mayya, Saratoga, CA (US); Parag Pritam Thakore, Los Gatos, CA (US); Stephen Craig Connors, San Jose, CA (US); Steven Michael Woo, Los Altos, CA (US); Sunil Mukundan, Chennai (IN); Thomas Harold Speeter, San Martin, CA (US)

(73) Assignee: NICIRA, INC., Palo Alto, CA (US)

( * ) Notice: Subject to any disclaimer, the term of this patent is extended or adjusted under 35 U.S.C. 154(b) by 37 days.

(21) Appl. No.: 15/097,282

(22) Filed: Apr. 12, 2016

(65) Prior Publication Data

US 2016/0315912 A1    Oct. 27, 2016

Related U.S. Application Data

(60) Provisional application No. 62/146,786, filed on Apr. 13, 2015.

(51) Int. Cl.
*H04L 29/06* (2006.01)
*H04L 12/66* (2006.01)
(Continued)

(52) U.S. Cl.
CPC ...... *H04L 63/0272* (2013.01); *H04L 12/4633* (2013.01); *H04L 12/4641* (2013.01);
(Continued)

(58) Field of Classification Search
CPC . H04L 63/0272; H04L 63/0281; H04L 49/35; H04L 45/42; H04L 12/4633;
(Continued)

(56) References Cited

U.S. PATENT DOCUMENTS 7,003,481 B2 * 2/2006 Banka ............... G06Q 30/0601
                                                      705/26.1
8,111,692 B2    2/2012 Ray
(Continued)

FOREIGN PATENT DOCUMENTS

WO    2012167184 A2    12/2012

OTHER PUBLICATIONS

Non-Published commonly Owned U.S. Appl. No. 15/701,115, filed Sep. 11, 2017, 21 pages, Nicira, Inc.
(Continued)

*Primary Examiner* — Joseph P Hirl
*Assistant Examiner* — J. Brant Murphy
(74) *Attorney, Agent, or Firm* — Adeli LLP (57) ABSTRACT

In one aspect, a computerized system useful for implementing a virtual private network (VPN) including an edge device that automatically establishes an Internet Protocol Security (IPsec) tunnel alongside an unsecure Multipath Protocol (MP) tunnel with a gateway device in preparation for a transmission of a secure traffic communication. The edge device has a list of local subnets. The edge device sends the list of local subnets to the gateway during an initial MP tunnel establishment handshake message exchange between the edge device and the gateway device. Each subnet includes an indication of whether the subnet is reachable over the VPN. A gateway device that automatically establishes the IPsec tunnel alongside the unsecure MP tunnel with the edge device. An enterprise datacenter server that comprises an orchestrator module that receives a toggle the
(Continued)

VPN command and enables the VPN on the orchestrator. The orchestrator informs the edge device the list of subnets is accessible over the VPN causing the edge device to update the gateway device with a new list of subnets of the edge device that accessible over the VPN.

20 Claims, 9 Drawing Sheets

(51) Int. Cl.
  *H04L 12/46* (2006.01)
  *H04L 12/717* (2013.01)
  *H04L 12/931* (2013.01)
  *H04L 29/08* (2006.01)
  *G06N 99/00* (2010.01)

(52) U.S. Cl.
  CPC .............. *H04L 12/66* (2013.01); *H04L 45/42* (2013.01); *H04L 49/35* (2013.01); *H04L 63/029* (2013.01); *H04L 63/0281* (2013.01); *G06N 99/005* (2013.01); *H04L 67/10* (2013.01)

(58) Field of Classification Search
  CPC ... H04L 12/66; H04L 63/029; H04L 12/4641; H04L 67/10; G06N 99/005
  See application file for complete search history.

(56) References Cited

U.S. PATENT DOCUMENTS

| | | | |
|---|---|---|---|
| 8,566,452 B1* | 10/2013 | Goodwin, III | H04L 63/0281 709/227 |
| 9,071,607 B2 | 6/2015 | Twitchell, Jr. | |
| 9,450,817 B1 | 9/2016 | Bahadur et al. | |
| 9,715,401 B2 | 7/2017 | Devine et al. | |
| 9,722,815 B2 | 8/2017 | Mukundan et al. | |
| 2002/0198840 A1* | 12/2002 | Banka | G06Q 30/0601 705/50 |
| 2003/0112808 A1* | 6/2003 | Solomon | H04L 12/4633 370/400 |
| 2003/0202506 A1 | 10/2003 | Perkins et al. | |
| 2003/0219030 A1 | 11/2003 | Gubbi | |
| 2004/0059831 A1* | 3/2004 | Chu | H04L 41/0893 709/242 |
| 2004/0068668 A1* | 4/2004 | Lor | H04L 63/107 726/15 |
| 2006/0114838 A1* | 6/2006 | Mandavilli | H04L 41/06 370/254 |
| 2006/0171365 A1* | 8/2006 | Borella | H04L 12/4633 370/338 |
| 2006/0182034 A1 | 8/2006 | Klinker et al. | |
| 2007/0121486 A1* | 5/2007 | Guichard | H04L 45/02 370/216 |
| 2007/0260746 A1* | 11/2007 | Mirtorabi | H04L 12/66 709/238 |
| 2008/0049621 A1* | 2/2008 | McGuire | H04L 12/6418 370/236.2 |
| 2008/0080509 A1* | 4/2008 | Khanna | H04L 12/4641 370/392 |
| 2008/0219276 A1* | 9/2008 | Shah | H04L 12/4641 370/401 |
| 2009/0154463 A1* | 6/2009 | Hines | H04L 12/4645 370/392 |
| 2010/0008361 A1* | 1/2010 | Guichard | H04L 45/00 370/392 |
| 2011/0153909 A1 | 6/2011 | Dong | |
| 2012/0008630 A1* | 1/2012 | Ould-Brahim | H04L 12/4625 370/392 |
| 2012/0157068 A1 | 6/2012 | Eichen et al. | |
| 2012/0221955 A1 | 8/2012 | Raleigh et al. | |
| 2012/0300615 A1 | 11/2012 | Kempf et al. | |
| 2013/0019005 A1 | 1/2013 | Hui et al. | |
| 2013/0021968 A1 | 1/2013 | Reznik et al. | |
| 2013/0128889 A1 | 5/2013 | Mathur et al. | |
| 2013/0173788 A1* | 7/2013 | Song | H04L 45/02 709/224 |
| 2013/0283364 A1 | 10/2013 | Chang et al. | |
| 2014/0019604 A1* | 1/2014 | Twitchell, Jr. | H04L 45/586 709/223 |
| 2014/0219135 A1* | 8/2014 | Li | H04L 12/4641 370/254 |
| 2014/0223507 A1* | 8/2014 | Xu | H04L 63/0272 726/1 |
| 2015/0334696 A1* | 11/2015 | Gu | H04L 67/1095 718/1 |
| 2015/0363733 A1* | 12/2015 | Brown | G06Q 10/06316 705/7.26 |
| 2016/0142373 A1* | 5/2016 | Ossipov | H04L 63/0236 713/171 |
| 2017/0126564 A1 | 5/2017 | Mayya et al. | |
| 2017/0134186 A1 | 5/2017 | Mukundan et al. | |
| 2017/0237710 A1 | 8/2017 | Mayya et al. | |
| 2018/0034668 A1 | 2/2018 | Mayya et al. | |

OTHER PUBLICATIONS

Non-Published commonly Owned U.S. Appl. No. 15/707,124, filed Sep. 18, 2017, 24 pages, Nicira, Inc.
Non-Published commonly Owned U.S. Appl. No. 15/784,404, filed Oct. 16, 2017, 21 pages, Nicira, Inc.
Non-Published commonly Owned U.S. Appl. No. 15/811,329, filed Nov. 13, 2017, 37 pages, Nicira, Inc.
Non-Published commonly Owned U.S. Appl. No. 15/838,052, filed Dec. 11, 2017, 28 pages, Nicira, Inc.
Non-Published commonly Owned U.S. Appl. No. 15/838,355, filed Dec. 11, 2017, 29 pages, Nicira, Inc.
Petition for Post-Grant Review of U.S. Pat. No. 9,722,815, filed May 1, 2018, 106 pages.

* cited by examiner

FIGURE 8

METHOD AND SYSTEM OF ESTABLISHING A VIRTUAL PRIVATE NETWORK IN A CLOUD SERVICE FOR BRANCH NETWORKING

CROSS-REFERENCE TO RELATED APPLICATIONS

This application is a claims priority from provisional U.S. Application Provisional No. 62/146,786 filed 13 Apr. 2015. This application is hereby incorporated by reference in its entirety.

FIELD OF THE INVENTION

This application relates generally to computer networking, and more specifically to a system, article of manufacture and method of establishing a virtual private network in a cloud service for branch networking.

DESCRIPTION OF THE RELATED ART

Employees working in branch offices of an Enterprises typically need to access resources that are located in another branch office. In some cases, these are located in the Enterprise Data Center, which is a central location for resources. Access to these resources is typically obtained by using a site-to-site VPN, which establishes a secure connection over a public network (e.g. the Internet, etc.). There may be dedicated computer equipment in the branch office, the other branch office and/or Data Center which establishes and maintains the secure connection. These types of site-to-site VPNs need to be setup one at a time and can be resource intensive to set up and maintain.

BRIEF SUMMARY OF THE INVENTION

In one aspect, a computerized system useful for implementing a virtual private network (VPN) including an edge device that automatically establishes an Internet Protocol Security (IPsec) tunnel alongside an unsecure Multipath Protocol (MP) tunnel with a gateway device in preparation for a transmission of a secure traffic communication. The edge device has a list of local subnets. The edge device sends the list of local subnets to the gateway during an initial MP tunnel establishment handshake message exchange between the edge device and the gateway device. Each subnet includes an indication of whether the subnet is reachable over the VPN. A gateway device that automatically establishes the IPsec tunnel alongside the unsecure MP tunnel with the edge device. An enterprise datacenter server that comprises an orchestrator module that receives a toggle the VPN command and enables the VPN on the orchestrator. The orchestrator informs the edge device the list of subnets is accessible over the VPN causing the edge device to update the gateway device with a new list of subnets of the edge device that accessible over the VPN.

BRIEF DESCRIPTION OF THE DRAWINGS

FIGS. 5 A-B illustrates an example of a system of cloud multipath to an Internet endpoint, according to some embodiments.

The Figures described above are a representative set, and are not exhaustive with respect to embodying the invention.

DESCRIPTION

Disclosed are a system, method, and article of manufacture for establishing a virtual private network in a cloud service for branch networking. The following description is presented to enable a person of ordinary skill in the art to make and use the various embodiments. Descriptions of specific devices, techniques, and applications are provided only as examples. Various modifications to the examples described herein can be readily apparent to those of ordinary skill in the art, and the general principles defined herein may be applied to other examples and applications without departing from the spirit and scope of the various embodiments.

Reference throughout this specification to "one embodiment," "an embodiment," 'one example,' or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art can recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, and they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Definitions

Example definitions for some embodiments are now provided.

Cloud computing can involve deploying groups of remote servers and/or software networks that allow centralized data storage and online access to computer services or resources. These groups of remote serves and/or software networks can be a collection of remote computing services.

Cloud Edge (CE) can include a cloud multipath to an Internet endpoint.

Customer-premises equipment (CPE) can be any terminal and associated equipment located at a subscriber's premises and connected with a carrier's telecommunication channel at the demarcation point.

Edge device can be a device that provides an entry point into enterprise or service provider core networks. An edge device can be software running in a virtual machine (VM) located in a branch office and/or customer premises.

Flow can be a grouping of packets that match a five (5) tuple which is a combination of Source IP Address (SIP), Destination IP Address (DIP), L4 Source Port (SPORT) and L4 Destination Port (DPORT) and the L4 protocol (PROTO).

Forward error correction (FEC) (e.g. channel coding) can be a technique used for controlling errors in data transmission over unreliable or noisy communication channels.

Deep learning can be a type of machine learning based on a set of algorithms that attempt to model high-level abstractions in data by using model architectures, with complex structures or otherwise, composed of multiple non-linear transformations Deep Packet Inspection (DPI) can be the ability to analyze the different layers of a packet on the network.

Gateway can be a node (e.g. a route on a computer network that serves as an access point to another network.

Internet Protocol Security (IPsec) can be a protocol suite for securing Internet Protocol (IP) communications by authenticating and encrypting each IP packet of a communication session.

Multiprotocol Label Switching (MPLS) can be a mechanism in telecommunications networks that directs data from one network node to the next based on short path labels rather than long network addresses, thus avoiding complex lookups in a routing table.

Orchestrator can include a software component that provides multi-tenant and role based centralized configuration management and visibility.

Quality of Service (QoS) can include the ability to define a guaranteed set of actions such as routing, resource constraints (e.g. bandwidth, latency etc.).

Software as a service (SaaS) can be a software licensing and delivery model in which so sere is licensed on a subscription bask and is centrally hosted.

Tunneling protocol can allow a network user to access or provide a network service that the underlying network does not support or provide directly.

Virtual Desktop Infrastructure (VDI) is a desktop-oriented service that hosts user desktop environments on remote servers and/or blade PCs. Users access the desktops over a network using a remote display protocol.

Virtual private network (VPN) can extend a private network across a public network, such as the Internet. It can enable users to send and receive data across shared or public networks as if their computing devices were directly connected to the private network, and thus benefit from the functionality, security and management policies of the private network.

Voice over IP (VoIP) can a methodology and group of technologies for the delivery of voice communications and multimedia sessions over Internet Protocol (IP) networks, such as the Internet.

Additional example definitions are provided herein.

Scalable, Self-Healing Network Cloud Service for Branch Networking

Figure 1:
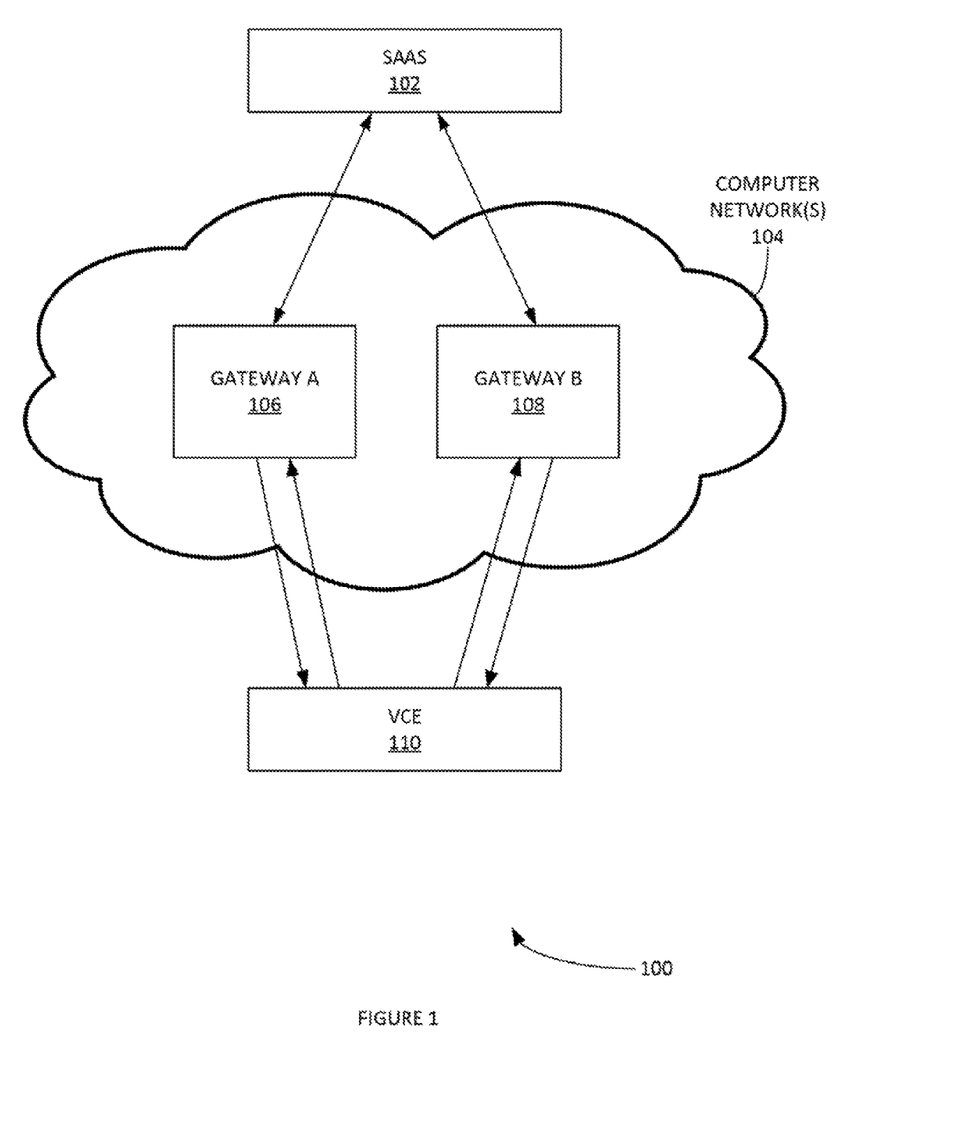
FIG. 1 illustrates an example self-healing network with redundant gateways, according to some embodiments.

FIG. 1 illustrates an example self-healing network 100 with redundant gateways, according to some embodiments. In network 100, data traffic can be routed to different gateways for different purposes. Multiple gateways can serve the same destination utilizing dynamic routing protocol. As services (e.g. SaaS 102) in the Internet (e.g. computer networks 104) may not centrally located. The combination of the Internet's wide distribution of services and/or changes in the transport quality across can lead to the use of different egress points to access different destinations. This is accomplished by deploying multiple gateways (e.g. gateways A-B 106-108) in stand-alone or redundant configurations.

An orchestrator can inform each edge device (e.g. VCE 110) of a list of gateways it has been assigned. Additionally, routes and/or services can be assigned a subset of the gateway list that can be used for communication with a specific destination. The edge device can then perform a static determination by metrics assigned to each gateway. For example, each gateway can be assigned a metric based on geographic distance from the edge and/or a dynamic determination based on empirically measured loss, latency and/or jitter to the gateway across the Internet.

In the redundant configuration of FIG. 1, gateways A-B 106-10 can support dynamic routing protocols on the non-edge device side. This can ensure that the gateway chosen for traffic destined from the edge to the gateway is also advertised from the gateway upstream as the route with the lowest cost for return traffic. Various attributes of gateways are now discussed.

Figure 2:
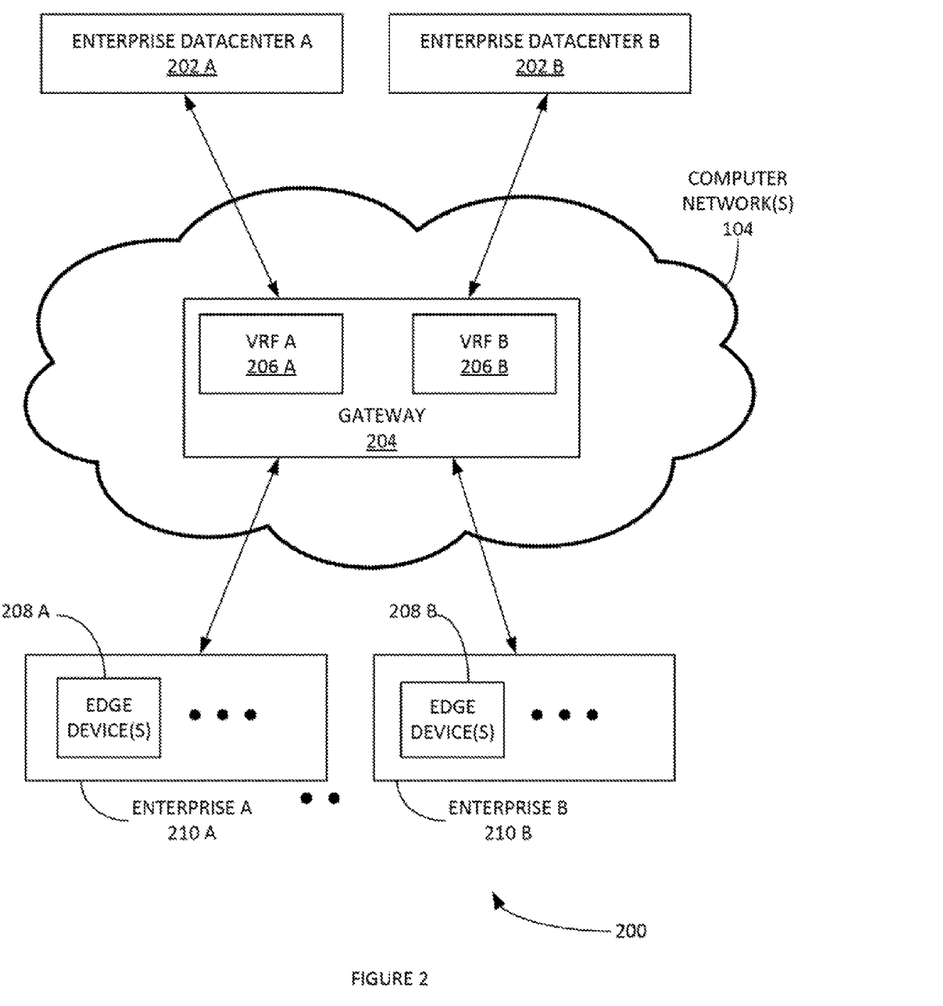
FIG. 2 illustrates an example system that includes autonomous gateways, according to some embodiments.

FIG. 2 illustrates an example system 200 that includes autonomous gateways, according to some embodiments. Gateway High Availability (HA) and horizontal scalability can be inherent as configuration is edge-driven and not configured on gateway 204. Edge tunnel initialization can configure, gateway 204. Edge devices 208 A-B can communicate QoS information to gateway 204 so they have information on how to treat network traffic. Implementing versioning in the flow header can ensures that gateway 204 have the correct QoS information. This is accomplished by creating flows with a version number of 1 on the edge and incrementing this version every time a policy change is enacted on the edge. If the gateway receives a message with a higher than expected version number in the header, it will request the edge to send the updated policy information.

It is noted that each individual gateway is a self-contained autonomous entity. This is accomplished by driving configuration of gateway 204 through the edge devices 208 A-B rather than gateway 204 being directly configured by the Orchestrator. In the initial negotiation, edge devices 208 A-B can send an MP_INIT message e.g. an initial MP tunnel establishment handshake message exchange between the edge device and the gateway device) which contains all the information needed to identify the edge device and serve as a secure and unsecure gateway for edge device traffic. This can include a logical identifier for the enterprise which is used for virtual routing and/or forwarding. The logical identifier can also be used for subnets that are routable behind edge devices 208 A-B.

If edge devices 208 A-B is the first edge device belonging to the enterprise to connect to gateway 204, a new virtual routing and forwarding (VRF) table can be created for the enterprise. Edge devices 208 A-B's subnets can be inserted into the enterprise VRF. If edge devices 208 A-B are not the first from an enterprise to connect, the enterprise logical identifier can be used to index into the existing VRF and edge devices 208 A-B's subnets can be added to the existing table.

In another example, when a new flow is created on an edge device, the parameters used to perform QoS and/or routing on the flow can be transmitted along with the first packet to any of the gateway 204 that are handling the flow. In this manner gateway 204 can be inherently highly available. If the gateway service is removed and replaced with a new gateway service instance, edge devices 208 A-B can send a new MP_INIT which can recreate the VRF and then continue sending data traffic uninterrupted through the gateway.

By this same token, gateway 204 can be highly available because the edge can switch between gateways without interrupting customer traffic. For example, when an orchestrator inserts an additional gateway in a gateway list that can be assigned an edge device. The edge device can then connect and begin using the gateway seamlessly without any requirement for orchestrator to gateway communication. This removes the need for the orchestrator to synchronize configuration changes on the edge device and the gateway as the edge device is used as the intermediary.

In another example, a gateway need not be a single gateway instance but the Internet Protocol (IP) address may be the external facing IP address of a gateway load balancer. The gateway load balancer can start and stop individual gateway instances. If the gateway load balancers detects that an instance is near its CPU and/or throughput capacity, it can shift traffic to an alternate gateway transparently and/or create a new gateway and begin steering connections to it. When gateway reboots, upgrades or maintenance are required, the gateway load balancer can steer traffic away from those instances that require maintenance to make these operations transparent to the end user.

Figure 3:
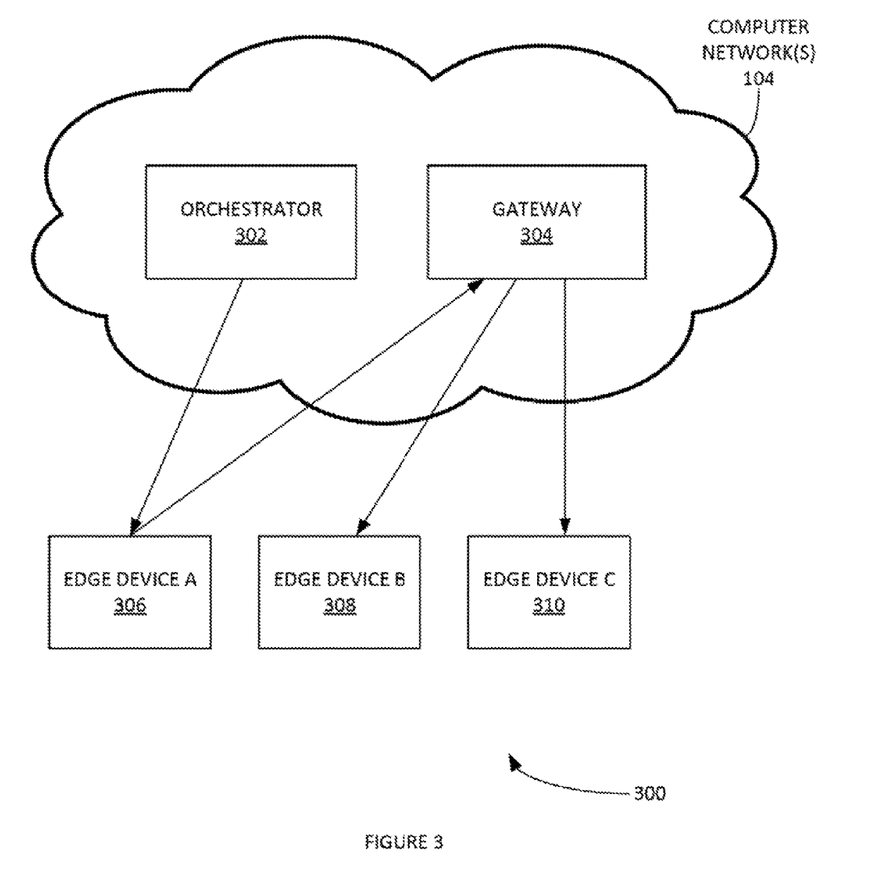
FIG. 3 illustrates an example of a system of an instant VPN, according to some embodiments.

FIG. 3 illustrates an example of a system 300 of an instant VPN, according to some embodiments. The edge device and gateway can automatically negotiate IPsec tunnels alongside their unsecure Velocloud Multipath Protocol (VCMP) tunnels in preparation for the transmission of secure traffic. This can be performed irrespective of whether or not a VPN has been enabled on the device. In this manner, the network can be prepared to transmit secure traffic at any time. Leveraging this, an "Instant VPN" can be delivered by toggling VPN on or off on the orchestrator. Each edge device has a list of local subnets that are sent to the gateway during MP_INIT. Each subnet is can include an indication of whether or not it is reachable over VPN. When VPN is enabled on the orchestrator, each edge device can be informed that its subnets are reachable over VPN and each edge device can update its gateways with this information. When VPN is disabled on the orchestrator, each edge device can be informed that its subnets are not reachable over VPN. The edge device can update the gateway accordingly.

Between each edge device and its associated gateways can be a routing protocol. The routing protocol can relay state information to peers that are one hop away. For example, edge device A can have a subnet A. Edge device B can have subnet B. When the user enables VPN on the orchestrator, edge device A and edge device B can inform the gateways that their local subnets A and B are reachable over VPN. The gateway(s) can then inform peers in the enterprise VRF. In this way, a message can be sent to edge device B instructing it that subnet A is now reachable through it. A message can also be sent to edge device A instructing it that subnet B is now reachable through it. When an edge device loses connectivity to a gateway, the gateway can relay to peers in the VRF that the subnet is no longer reachable and the edge device updates it route table to mark all routes via that unreachable gateway. In this way, gateways can be added or removed, and/or routes added and removed, without restarts and/or loss of connectivity assuming at least one gateway is connected at all times.

In some examples, "Always on" IPsec tunnels can be provided. Enable/disable VPN operations can include the insertion and/or removal of routes for the appropriate VPN zone. VRF can include enterprise logical identifier on gateway ensuring multi-tenancy.

Figure 4:
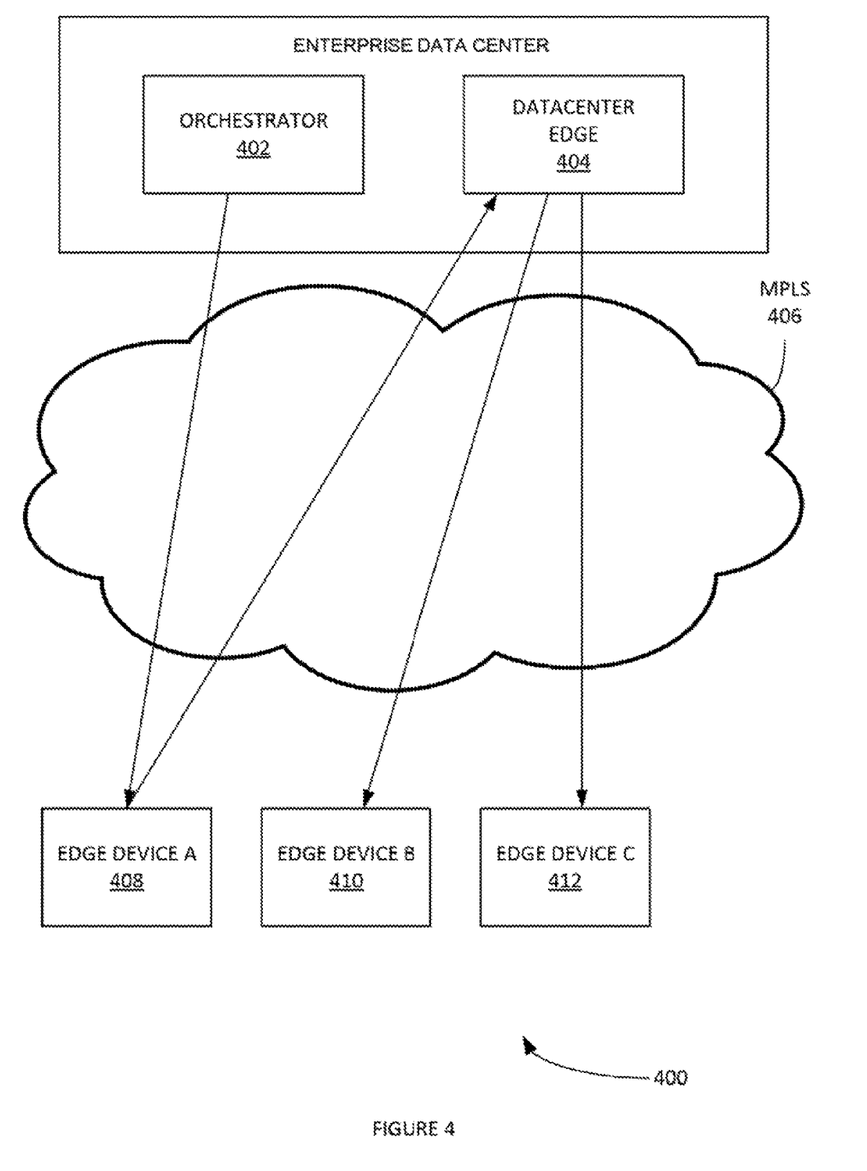
FIG. 4 illustrates another example of a system of an instant VPN, according to some embodiments.

FIG. 4 illustrates another example of a system 400 of an instant VPN, according to some embodiments. A special edge device called a Datacenter Edge (DCE) can be deployed as customer premise equipment. The DCE can subsume some of the functionality of the gateway, including this route protocol management. A typical use case for this deployment can be in a pure MPLS network in which there are no public internet links and thus no public internet gateways. In one example, route propagation can occur the same as described supra except that the VRF and routing protocol messages are managed by the DCE.

Figure 5A:
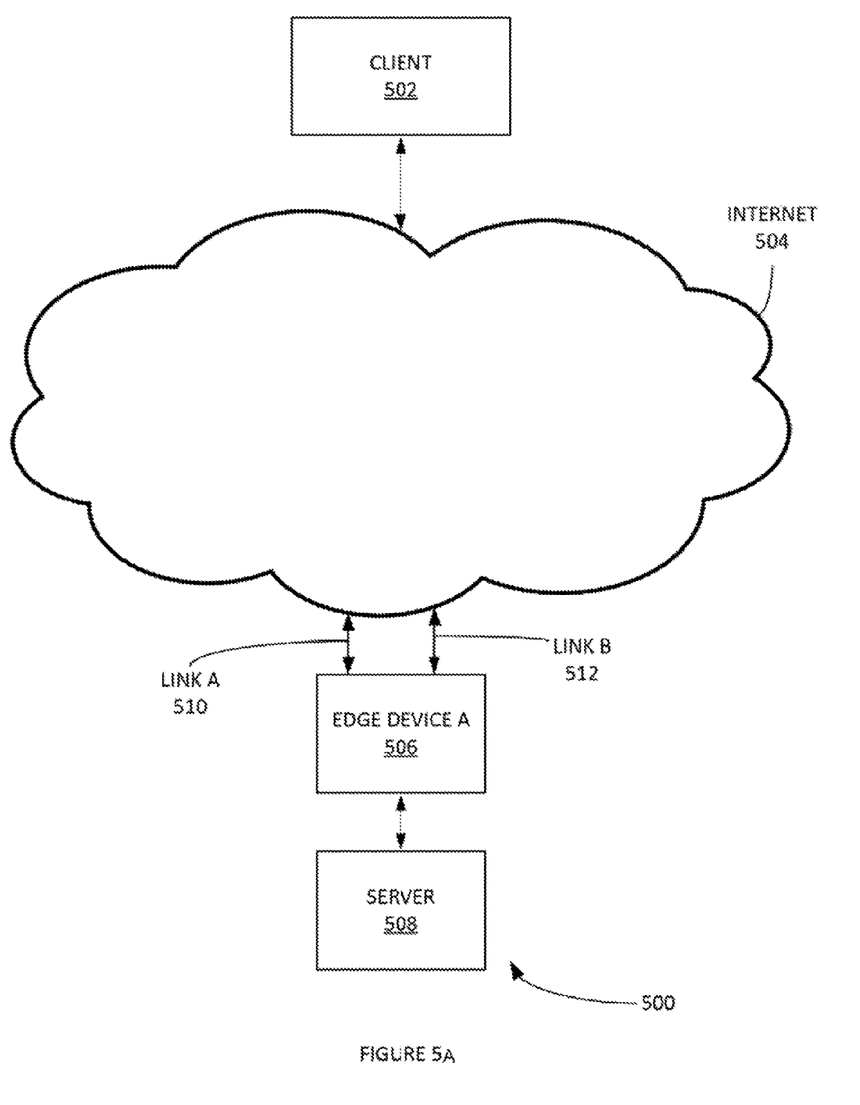
Figure 5B:
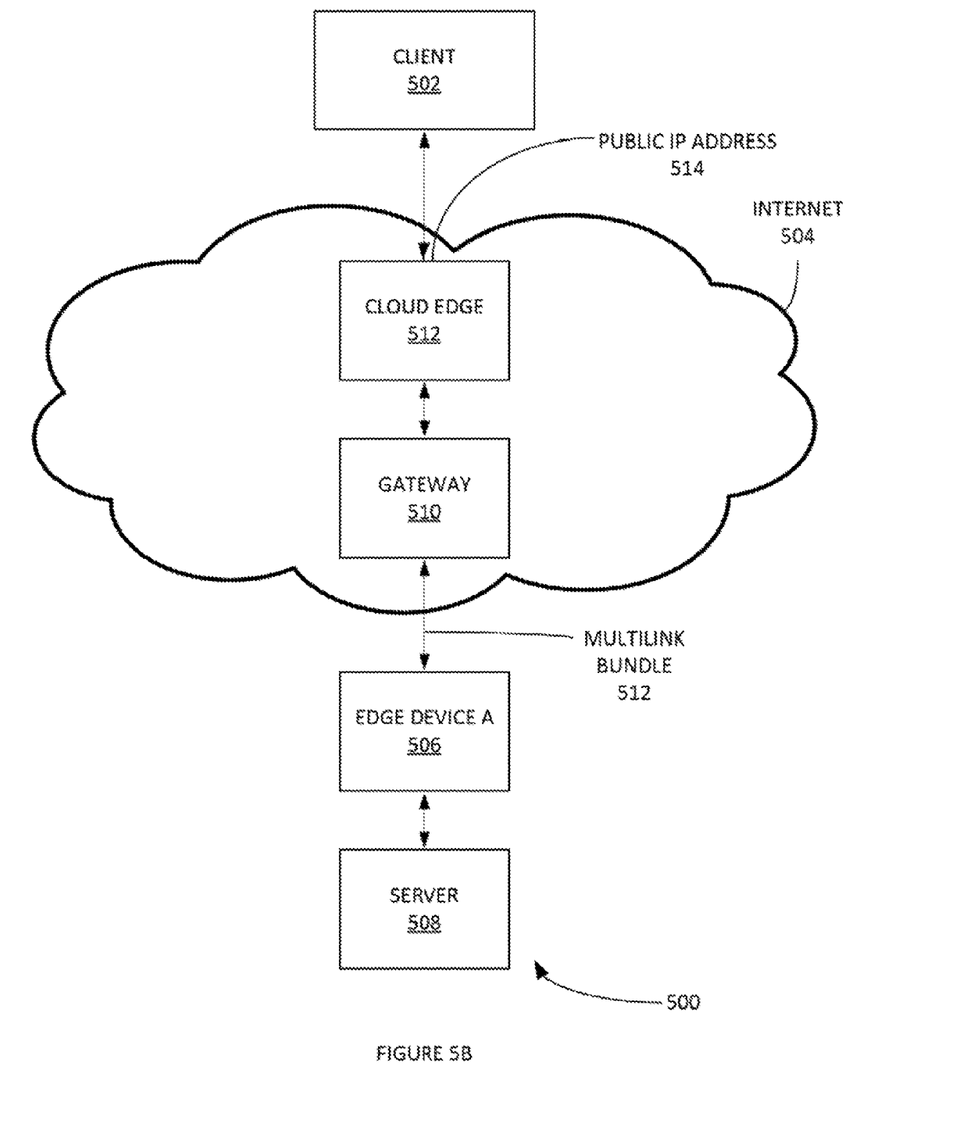

FIGS. 5 A-B illustrate an example of a system 500 of a cloud multipath to an Internet endpoint (branch) (e.g. a cloud edge 512), according to some embodiments. An edge and gateway multipath solution can deliver a reliable connection across the public internet for outbound connections initiated from the edge (e.g. edge devices 506) through the gateway 510, as well as for their return traffic. An alternate use case can include when the network traffic needs to be initiated from outside. For example, the network traffic can be initiated from the Internet to a server in the branch office behind the edge device. In an example deployment, this can be implemented by enabling inbound firewall rules to allow the traffic in one or more of the wide area network (WAN) links attached to the edge device. Such an inbound connection will be able to use only a single link. This may not provide the same reliability that is afforded to outbound connections. For instance, a session established on link A may fail if link A fails, and similarly for link B. Therefore there is a desire to be able to support inbound connections reliably without compromising the security of the deployment.

This can be achieved by a Cloud Edge (CE). The CE can sit in the cloud and joins the same VRF as that of the edge(s) with resources (e.g. a server) that are to be reliably accessed. This can be set to deny inbound traffic by default. However, it can allow the user to specify sources and destinations of traffic that are permitted. For example, a rule could be created that allows the public IP address of the client to reach the server via a public IP address that is assigned to the "LAN" side of the CE. The user can then connect to this public IP address in the cloud rather than the IP address of one of the links at the site directly, and securely connect over VPN to the server inside the network. The CE can be located anywhere in the Public Internet. In one example, the CE can be located in any of the public Cloud Service Providers (CSPs) like Amazon EC2®.

Intelligent Edge Device

An intelligent edge device can provide intelligent QoS. For example, applications may respond differently to key network parameters like latency, jitter, bandwidth, packet loss and processing capabilities such as available CPU cycles. For example, a VoIP application may use low bandwidth and may be sensitive to jitter, packet loss. The VoIP application may also consume a large number of CPU cycles despite the low throughput (e.g. because of smaller packet sizes). In contrast, VDI may use high bandwidth and low latency but may not very sensitive to jitter. Accordingly, a network stack can implement a suite of link optimization and remediation technologies to achieve the dual goal of optimal network resource utilization and remediating adverse network events, such as, inter alia: FEC to compensate for packet loss; jitter buffering to counter jitter; and per-packet load balancing to aggregate bandwidth usage and ensure the lowest latency path.

Smart QoS can map application flow into a traffic class and priority queue. A combination of the traffic class and priority queue can then decide the optimal routing, load balancing and remediation to be used for that flow given the prevailing network conditions at that point of time. The network stack can use the following innovations to adapt to dynamic network conditions:

In an intelligent default, the distributed management plane (e.g. an orchestrator) sets up the edge device with a set of default QoS settings for each application. Each application can then be tagged with an SLA. The SLA can indicate a hint to the edge device for the prioritization and/or sensitivity for that particular application.

In an intelligent pre-emption, a multi-tenant, geo-diverse, network transport agnostic overlay network can be implemented. This can create a situation where the network can pre-empt adverse and/or localized network events by statistical and heuristics based analysis of the network monitoring data that is collected at the orchestrator. This can remediate certain network conditions that are not addressed by adaptive QoS (e.g. tail drops which result in large number of packets dropped indiscriminately in the core of a service provider network) due to time taken to adapt and the fact that such a loss cannot be really compensated. In a geo-localized region, in the event of constant tail drops for a network service provider, the service can proactively turn on aggressive FEC (e.g. 'always-on FEC') for sensitive applications in both the specific geo-location. In one example, a slightly larger geography for sites that are using the same provider can be used in lieu of the specific geo-location. The 'always-on FEC' can also be configured at the orchestrator in order to pre-empt network error and react faster to network errors.

Adaptive QoS can be implemented by monitoring and/or instrumenting network paths. For example, adaptive QoS can be implemented to remediate a network condition that may not conform to the configured SLA for that application. To offset the overheads as a result of the continuous monitoring, the QoE (e.g. user responsiveness) can be periodically or constantly computed to reduce/augment the network monitoring.

Smart QoS can utilize deep learning methods. In addition to responding to dynamic network conditions, the smart QoS can work in tandem with application performance monitoring (APM) to adjust traffic priority based on L7 data. When the DPI engine fails to identify the application, the network stack can utilize statistical parameters (e.g. packet arrival rate, throughput) and heuristics (e.g. User Datagram Protocol (UDP) can be used by real-time applications) to identify the right set of technologies to provide the best performance.

Slow Learning with Crowdsourcing Examples

Slow learning (e.g. application aware routing) with crowdsourcing methods can include generating a prepopulated list of well-known applications augmented by mid-flow detected data from DPI engine. This can enable determination of application with the first packet. Prepopulated data is automatically validated by DPI engine and any changes are fed back locally as well as communicated to the orchestrator. Some or all data can be shared to other edges/enterprises via the orchestrator. In one example, L3, L4 network information can be used to create a composite application-routing database. The application-routing database can be populated by three different types of learning/sources. The first source of information built into the database can include a pre-populated map of DIP/DPORT (Destination Internet Protocol Address/Destination Port Number) to application types (e.g. termed fast learning). A second source of information can include a map of DIP/DPORT to applications that is learned from 'mid-flow' application detection by the DPI engine (e.g. slow learning). The third source of information can also include a map of DIP/DPORT to application names. This can include crowd-sourced (e.g. DIP/DPORT to application name mapping) information that is anonymized and aggregated at the orchestrator. This mapping can then be shared across different enterprises (e.g. crowd-sourced learning).

Various methods of populating, updating and recovering the application-routing database are now provided. The application-routing database can be pre-populated with the set of known applications that can be identified by the DIP/DPORT and/or packaged as a part of the CPE. Alternatively, it can be downloaded from the orchestrator. Additionally, an IT Administrator may enter customised DIP/DPORT to application mappings which can be added to the application routing database in the edge device via the orchestrator. This method can be a component of fast learning.

The application-routing database can also be updated by 'mid-flow' DPI detection data as a result of slow learning methods on the edge device. In addition to this, the fast learning data and slow learning updates from different enterprises can be anonymized and/or aggregated at the orchestrator. It can be sent down to all the edge device(s) under the management of the orchestrator. These updates can be of the crowd-sourced learning methods.

An example application-routing database recovery method is now provided. When an edge device first communicates with the orchestrator, it can receive the data for pre-population of the application-routing database. This information can include any updates. Updates from slow learning and/or crowd-sourced learning can be synchronised to shared memory areas in the edge device. The updates can be recovered from service outages.

Figure 6:
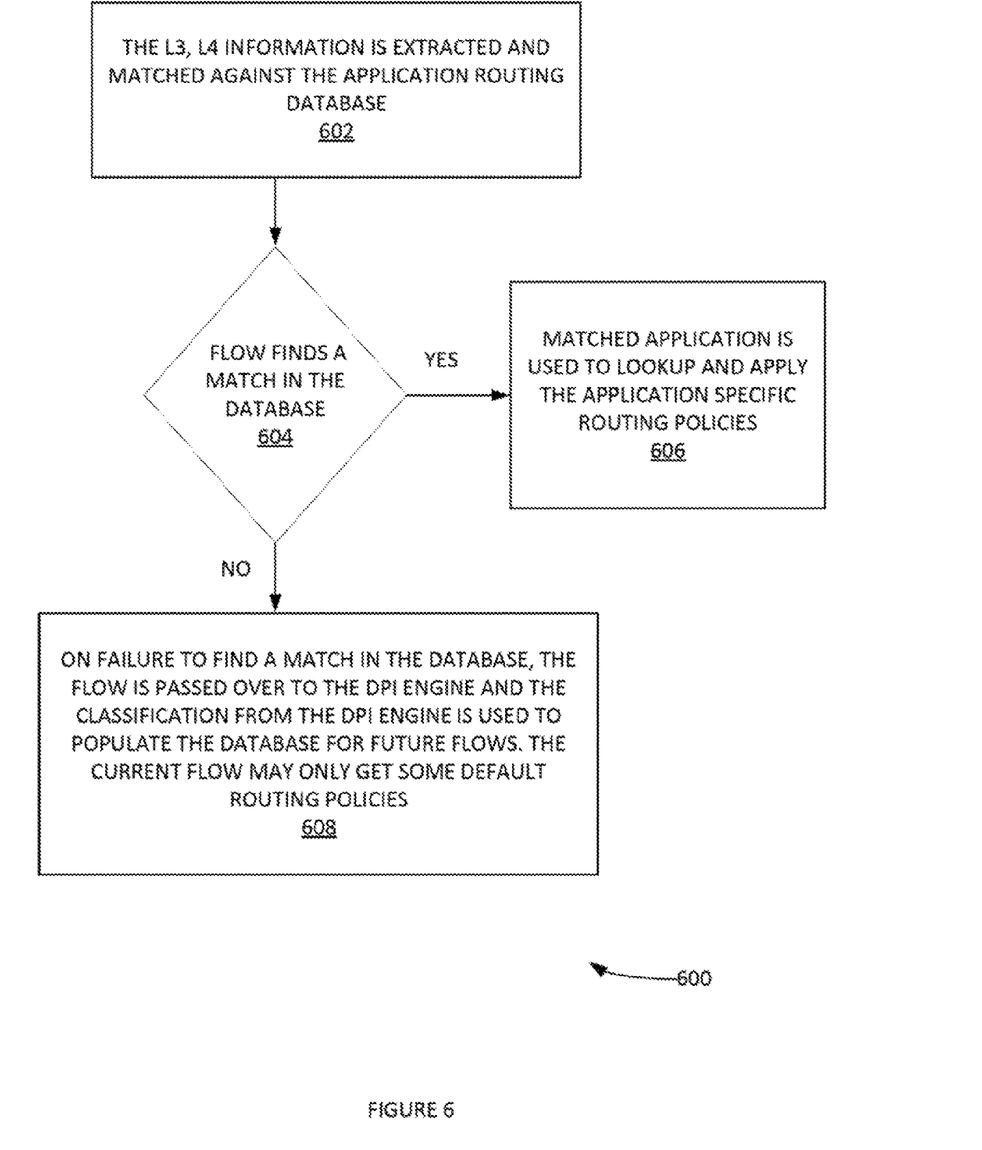
FIG. 6 illustrates an example process of an application aware routing, according to some embodiments.

FIG. 6 illustrates an example process 600 of an application aware routing, according to some embodiments. In step 602, the L3, L4 information is extracted and matched against the application routing database (e.g. database in FIG. 6). In step 604, if this flow does not find a match in the database, then process 600 moves to step 608. If 'yes', then process 600 moves to step 606. In step 606, the matched application is used to look-up and apply the application specific routing policies. In step 608, on failure to find a match in the database, the flow is passed over to the DPI engine. The classification from the DPI engine is used to populate the database for future flows. The current flow may obtain some default routing policies as well. In this way, when the same application flow is encountered again, it can find a successful match in database. The application specific routing policy can then be applied for that application flow. A worst case guarantee of application routing from the second flow can be provided in some examples.

Figure 7:
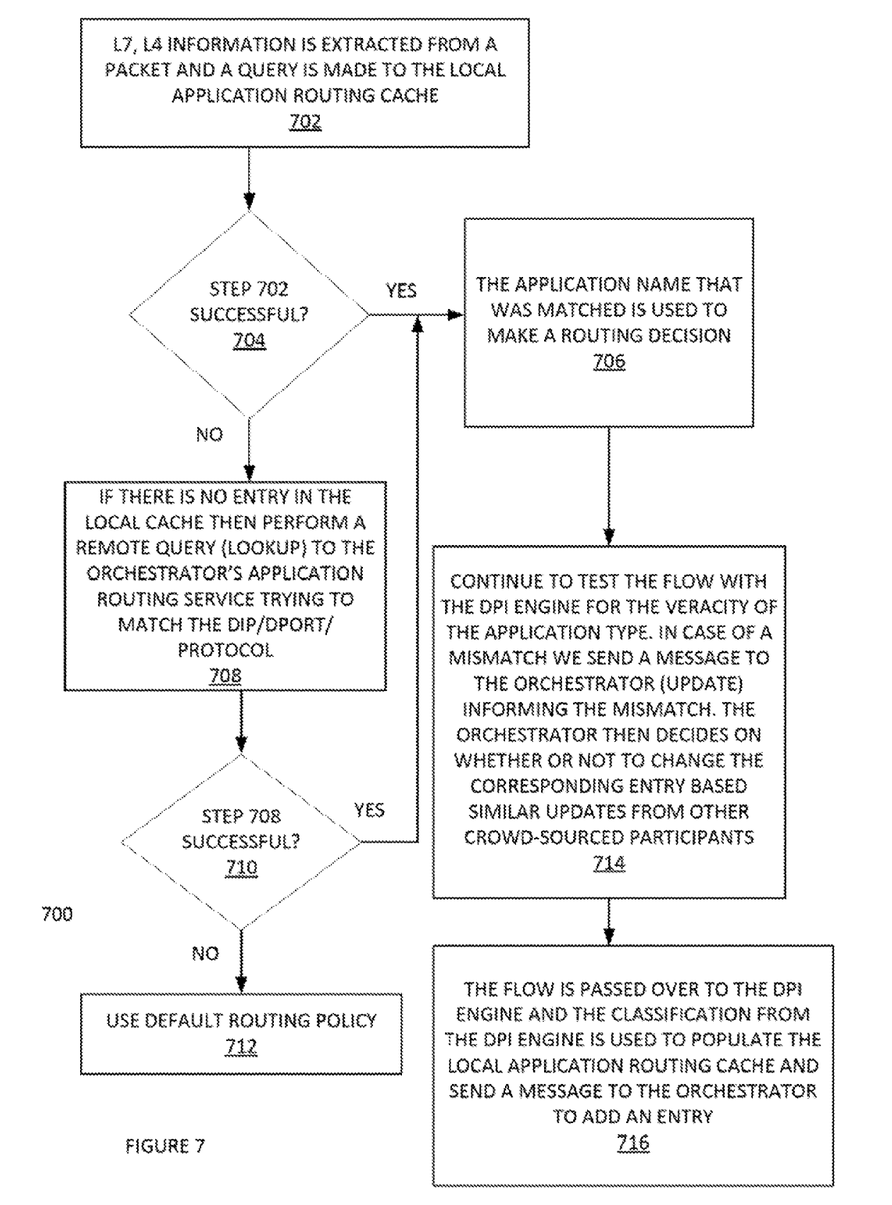
FIG. 7 illustrates another example process of an application aware routing, according to some embodiments.

FIG. 7 illustrates another example process 700 of an application aware routing, according to some embodiments. For example, in an alternative step 608, the L3, L4 information can be communicated to an application routing lookup service (e.g. can be a local service synchronized with an aggregated crowd source updated remote service running in the orchestrator like DNS). This can return the application match for the flow with a higher probability even on the first flow. In this incarnation, the application-routing database can reside in the orchestrator. The edge-device queries the application-routing database via the application routing lookup service. The edge-device can cache the responses from the lookup. Optionally, the cached entries can be expired using a TTL (Time-to-Live) value. More specifically, process 700 illustrates an example packet flow illustration.

In step 702, the L3, L4 information can extracted from a packet and a query is made to the local application routing cache (e.g. cache lookup). In step 704, it can be determined if step 702 is successful. If 'yes', then process 700 can proceed to step 706. If 'no' then process 700 can proceed to step 708. In step 708, process 700 can perform a remote query (e.g. lookup) to the orchestrator's application routing service to match the DIP/DPORT/PROTOCOL. In step 710, it can be determined if a successful lookup was implemented in step 708. If 'yes', then process 700 can proceed to step 706. If 'no', then process 700 can proceed to step 712. In step 712, process 700 can use the default routing policy and continue to step 716 where the flow is passed over to the DPI Engine and the classification from the DPI Engine is used to populate the local application routing cache and inform the Orchestrator for future flows. In step 705, the application name that was matched is used to make a routing decision. In step 714, process 700 can continue to test the flow with the DPI engine for the veracity of the application type. In case of a mismatch, process 700 can send a message to the orchestrator (e.g. with an update operation), thus informing of the mismatch. The orchestrator can then decides on whether or not to change the corresponding entry based similar updates from other crowd-sourced participants.

Additional Exemplary Computer Architecture and Systems

Figure 8:
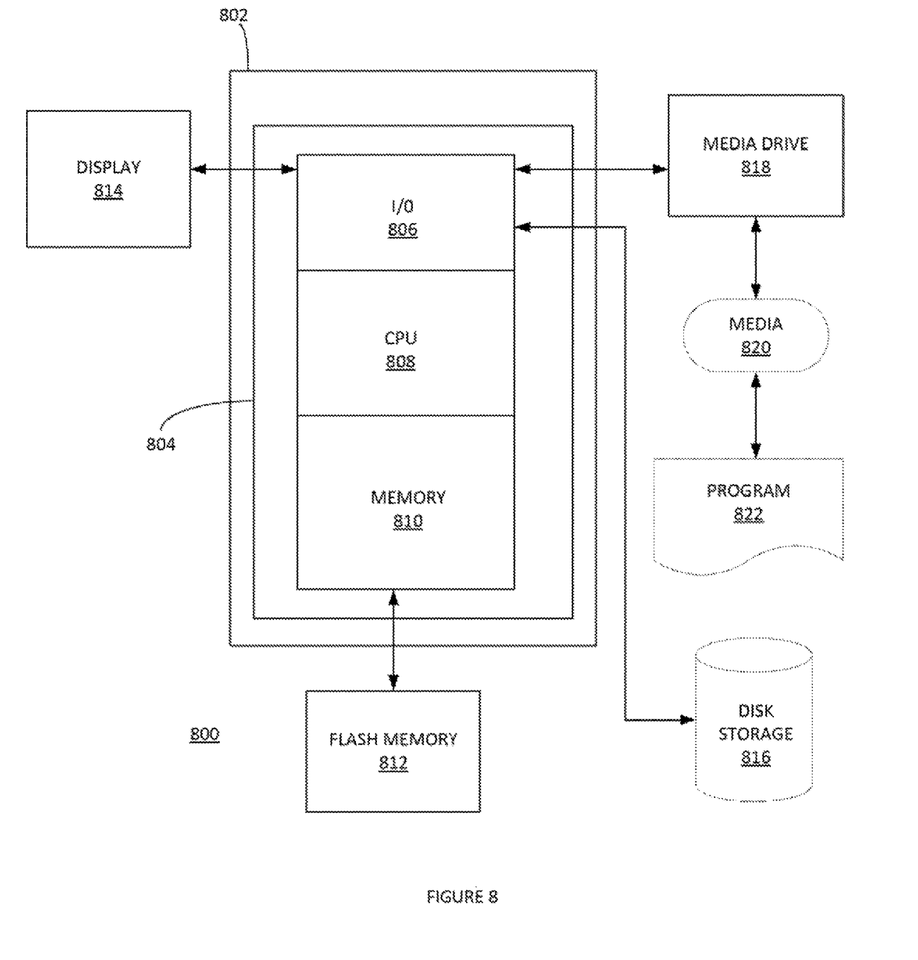
FIG. 8 depicts an exemplary computing system that can be configured to perform any one of the processes provided herein.

FIG. 8 depicts an exemplary computing system 800 that can be configured to perform any one of the processes provided herein. In this context, computing system 800 may include, for example, a processor, memory, storage, and I/O devices (e.g., monitor, keyboard, disk drive, Internet connection, etc.). However, computing system 800 may include circuitry or other specialized hardware for carrying out some or all aspects of the processes. In some operational settings, computing system 800 may be configured as a system that includes one or more units, each of which is configured to carry out some aspects of the processes either in software, hardware, or some combination thereof.

FIG. 8 depicts computing system 800 with a number of components that may be used to perform any of the processes described herein. The main system 802 includes a motherboard 804 having an I/O section 806, one or more central processing units (CPU) 808, and a memory section 810, which may have a flash memory card 812 related to it. The I/O section 806 can be connected to a display 814, a keyboard and/or other user input (not shown), a disk storage unit 816, and a media drive unit 818. The media drive unit 818 can read/write a computer-readable medium 820, which can contain programs 822 and/or data. Computing system 800 can include a web browser. Moreover, it is noted that computing system 800 can be configured to include additional systems in order to fulfill various functionalities. Computing system 800 can communicate with other computing devices based on various computer communication protocols such a Wi-Fi, Bluetooth® (and/or other standards for exchanging data over short distances includes those using short-wavelength radio transmissions), USB, Ethernet, cellular, an ultrasonic local area communication protocol, etc.

CONCLUSION

Although the present embodiments have been described with reference to specific example embodiments, various modifications and changes can be made to these embodiments without departing from the broader spirit and scope of the various embodiments. For example, the various devices, modules, etc. described herein can be enabled and operated using hardware circuitry, firmware, software or any combination of hardware, firmware, and software (e.g., embodied in a machine-readable medium).

In addition, it can be appreciated that the various operations, processes, and methods disclosed herein can be embodied in a machine-readable medium and/or a machine accessible medium compatible with a data processing system (e.g., a computer system), and can be performed in any order (e.g., including using means for achieving the various operations). Accordingly, the specification and drawings are to be regarded in an illustrative rather than a restrictive sense. In some embodiments, the machine-readable medium can be a non-transitory form of machine-readable medium.

What is claimed as new and desired to be protected by Letters Patent of the United States is:

1. A computerized system useful for implementing a virtual private network (VPN), the system comprising:
    an edge device that automatically establishes an Internet Protocol Security (IPsec) tunnel alongside an unsecure Multipath Protocol (MP) tunnel with a gateway device in a public cloud in preparation for a transmission of a secure traffic communication, wherein the edge device has a list of local subnets, and wherein the edge device sends the list of local subnets to the gateway device during an initial MP tunnel establishment handshake message exchange between the edge device and the gateway device, wherein each local subnet includes an indication of whether the local subnet is reachable over the VPN;
    the gateway device automatically establishing the IP sec tunnel alongside the unsecure MP tunnel with the edge device; and
    an orchestrator module operating on an enterprise datacenter server that receives a toggle-the-VPN command and enables the VPN on the orchestrator module, and wherein the orchestrator module informs the edge device that the list of local subnets is accessible over the VPN, causing the edge device to update the gateway device with a new list of local subnets of the edge device that are accessible over the VPN.

2. The computerized system of claim 1, wherein the VPN is disabled on the orchestrator module and the orchestrator module informs the edge device that the local subnets of the new list of local subnets of the edge device accessible over the VPN are no longer reachable over VPN.

3. The computerized system of claim 2, wherein the edge device updates the gateway device that the local subnets of the new list of local subnets are no longer reachable over VPN.

4. The computerized system of claim 1, wherein a routing protocol is implemented between the edge device and the gateway device.

5. The computerized system of claim 4, wherein the routing protocol relays state information of the edge device to a plurality of other gateway peers that are one hop away from the gateway device, and wherein the gateway peers of the plurality of gateway peers are listed in a virtual routing and forwarding (VRF) table.

6. The computerized system of claim 5, wherein the edge device is a first edge device, the system further comprising a second edge device that establishes a separate IPsec tunnel alongside a separate unsecure MP tunnel with the gateway device in preparation for a separate transmission of a secure traffic communication, wherein the second edge device has a second list of local subnets accessible over the VPN, wherein the second edge device informs the gateway device of the second list of local subnets of the second edge device accessible over the VPN.

7. The computerized system of claim 6, wherein the gateway device informs the plurality of gateway peers of the new list of local subnets of the first edge device accessible over the VPN and the second list of local subnets of the second edge device accessible over the VPN.

8. The computerized system of claim 6, wherein the first edge device comprises an entry point into an enterprise core network and the second edge device comprises a virtual machine located in a customer premises.

9. The computerized system of claim 1, wherein the gateway device automatically establishes the IPsec tunnel alongside the unsecure MP tunnel with the edge device irrespective of whether the VPN has been enabled on the edge device.

10. The computerized system of claim 1, wherein the gateway device is implemented in a cloud-computing platform.

11. A method for an edge device for implementing a virtual private network (VPN), the method comprising:
    establishing an unsecure Multipath Protocol (MP) tunnel with a gateway device in a public cloud, wherein establishing the MP tunnel comprises an establishment handshake message exchange comprising sending a list of local subnets of the edge device to the gateway device, wherein each local subnet includes an indication of whether the local subnet is reachable over the VPN;
    automatically establishing an Internet Protocol Security (IPsec) tunnel with the gateway device alongside the MP tunnel in preparation for a transmission of a secure traffic communication;
    receiving an update that the list of local subnets is accessible over the VPN from an orchestrator module executing on an enterprise datacenter, wherein the orchestrator module sends the update in response to receiving a toggle-the-VPN command, and in response to the toggle-the-VPN command the orchestrator module also enables the VPN on the orchestrator module; and
    transmitting to the gateway device a new list of local subnets of the edge device that are accessible over the VPN.

12. The method of claim 11, wherein the VPN is disabled on the orchestrator module and the orchestrator module informs the edge device that the local subnets of the new list of local subnets are no longer reachable over VPN.

13. The method of claim 12, wherein the edge device updates the gateway device that the local subnets of the new list of local subnets are no longer reachable over VPN.

14. The method of claim 11, wherein a routing protocol is implemented between the edge device and the gateway device.

15. The method of claim 14, wherein the routing protocol relays state information of the edge device to a plurality of other gateway peers that are one hop away from the gateway device, and wherein the gateway peers of the plurality of other gateway peers are listed in a virtual routing and forwarding (VRF) table.

16. The method of claim 15, wherein the edge device is a first edge device, the method further comprising, at a second edge device, establishing a separate IPsec tunnel alongside a separate unsecure MP tunnel with the gateway device in preparation for a separate transmission of a secure traffic communication, wherein the second edge device has a second list of local subnets accessible over the VPN, wherein the second edge device informs the gateway device of the second list of local subnets of the second edge device accessible over the VPN.

17. The method of claim 16, wherein the gateway device informs the plurality of gateway peers of the new list of local subnets of the first edge device accessible over the VPN and the second list of local subnets of the second edge device accessible over the VPN.

18. The method of claim 17 further comprising the second edge device transmitting a secure traffic communication over the VPN to the gateway device, wherein the gateway device transmits the secure traffic communication over the internet through the VPN to the first edge device.

19. The method of claim 16, wherein the first edge device comprises an entry point into an enterprise core network and the second edge device comprises a virtual machine located in a customer premises.

20. The method of claim 11, wherein the gateway device automatically establishes the IPsec tunnel alongside the unsecure MP tunnel with the edge device irrespective of whether or not the VPN has been enabled on the edge device.

* * * * *